(12) United States Patent
Thiemann et al.

(10) Patent No.: US 8,445,615 B2
(45) Date of Patent: *May 21, 2013

(54) TWO-COMPONENT ADHESIVE SUITABLE FOR CONSTRUCTION PURPOSES, ITS USE AND THE CURED STRUCTURAL BONDS OBTAINED THEREBY

(75) Inventors: Frank Thiemann, Landsberg/Lech (DE); Armin Pfeil, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 91 days.

This patent is subject to a terminal disclaimer.

(21) Appl. No.: 12/955,838

(22) Filed: Nov. 29, 2010

(65) Prior Publication Data
US 2011/0143061 A1  Jun. 16, 2011

(30) Foreign Application Priority Data
Nov. 30, 2009 (EP) .................................. 09177428

(51) Int. Cl.
*C08K 5/101* (2006.01)
*C08K 5/23* (2006.01)
*C08K 5/36* (2006.01)
*B32B 27/30* (2006.01)

(52) U.S. Cl.
USPC .......... 526/282; 526/184; 526/222; 525/418; 525/451; 525/262; 525/261; 525/387; 156/326

(58) Field of Classification Search
USPC .................. 526/282, 184, 222; 525/418, 451, 525/263, 261, 387; 156/326
See application file for complete search history.

(56) References Cited

U.S. PATENT DOCUMENTS

| | | | | |
|---|---|---|---|---|
| 4,591,618 A | * | 5/1986 | Naito et al. | 525/279 |
| 5,478,427 A | * | 12/1995 | Huver et al. | 156/273.3 |
| 5,854,305 A | * | 12/1998 | Schwiegk et al. | 523/130 |
| 2002/0091214 A1 | | 7/2002 | Waanders et al. | |
| 2008/0300361 A1 | * | 12/2008 | Jansen et al. | 524/609 |
| 2011/0136942 A1 | * | 6/2011 | Pfeil | 524/2 |

FOREIGN PATENT DOCUMENTS

| | | |
|---|---|---|
| EP | 0 761 792 | 3/2000 |
| EP | 0 713 015 | 8/2001 |
| EP | 0 974 610 | 3/2004 |
| EP | 1 118 628 | 8/2004 |
| EP | 1 118 628 B1 | 8/2004 |
| WO | WO 2005/100436 A1 | 10/2005 |
| WO | WO 2007/042199 A1 | 4/2007 |

* cited by examiner

*Primary Examiner* — Satya Sastri
(74) *Attorney, Agent, or Firm* — Crowell & Moring LLP

(57) ABSTRACT

A two-component adhesive composition suitable for structural bonding of concrete/concrete, steel/concrete, or steel/steel, as well as for structural strengthening and reinforcing applications with fiber reinforced polymers, is disclosed. The composition includes a resin component A with a peroxide containing at least one norbornene group and at least one methacrylate containing compound and a hardener component B comprising a peroxide and at least one thiol. The resin component A and the hardener component B are spatially separated from one another to inhibit any reaction before mixing of the components.

27 Claims, No Drawings

TWO-COMPONENT ADHESIVE SUITABLE FOR CONSTRUCTION PURPOSES, ITS USE AND THE CURED STRUCTURAL BONDS OBTAINED THEREBY

The present invention relates to a two-component fast curing structural adhesive composition that is suitable for construction purposes, particularly for structural bonding of concrete/concrete, steel/concrete, or steel/steel, as well as for structural strengthening and reinforcing applications with fiber reinforced polymers.

To define the technical wording used within this document, a structural adhesive comprises a curable resin, and optionally fillers and further additives to adjust reactivity and rheology. Usually it is applied as a two-component system consisting of the resin in the first component, and the hardener in the second component. The application of the two-component adhesive requires mixing of resin- and hardener-component prior to its use.

One of the more demanding structural applications is the structural adhesive application, as in this application the mechanical strength, the adhesion to concrete and the adhesion to steel must be very good.

Adhesives with high bond strengths, which don't require heating or irradiation for curing, and which are rather insensitive against humidity, and thus are useful for construction application on job sites, usually are based on epoxy-amine polyaddition systems or on radically curable methacrylate systems.

Epoxy-amine systems usually perform best in terms of mechanical and adhesive properties, but suffer from low curing velocity (resulting in limited usability at low temperatures) and the missing option of adjusting their working time accordingly. The presence of corrosive amines results in a health risk for the worker on the job site. Once cured, they usually show low heat resistance and creep resistance, thus limiting their upper in-service temperature.

Methacrylate adhesives, on the other side, can react very fast and offer the advantage of adjustable working and curing times (by selection of the proper type and amount of accelerator and inhibitor in the resin), show good low temperature reactivity, but they suffer from high shrinkage which can be as high as 20%, and they usually don't achieve the robust curing and the high bonding performance of epoxy-amine adhesives. Reference: Adhesive Bonding: Materials, Applications and Technology, Walter Brockmann, Paul Ludwig Geiss, Jürgen Klingen, K. Bernhard Schröder, Bettina Mikhail, Wiley-VCH, 2009, ISBN 3527318984, 9783527318988.

The object of this invention is to provide a novel fast curing structural adhesive composition that is suitable for construction purposes, particularly for structural bonding of concrete/concrete, steel/concrete, or steel/steel, as well as for structural strengthening and reinforcing applications with fiber reinforced polymers, which combines the best of these two chemistries.

Surprisingly, this problem can be solved by referring to and further development of WO2007/042199, which describes a method for chemical anchoring using resin compositions comprising a thiol component, a non aromatic carbon double bond containing resin, such as a norbornene functional resin, and optionally a reactive diluent. These resin compositions advantageously result in faster (compared to epoxy-amine resin systems as referred to above) curing in particular at low temperatures and in lower shrinkage (compared to methacrylate resin systems as referred to above), Examples of suitable reactive diluents that may be used according to WO2007/042199 are, for instance, dicyclopentadiene (DCPD), norbornadiene, vinylnorbornene, epoxyethyl norbornene. Considering the experimentals, an allyl containing reactive diluent especially triallyl isocyanurate (TAIC) was used as reactive diluent.

A disadvantage of the reactive diluents described in this publication is their relatively poor cutting power which means that for reducing the viscosity a relatively large amount of reactive diluent is required, which may result in reduced mechanical properties. However for many construction purposes the resins need to be filled or reinforced. These applications generally require low to very low viscosities of the resin in order to have a workable viscosity of the composite, filled resinous composition.

Another disadvantage is that changing the amount of reactive diluent only to a small extent has a large impact on the amount of thiol needed, making the system less robust, i.e. highly sensitive to variation in reactive diluent content.

WO-A-2005/100436 describes resin compositions that comprises a thiol component (XH component), a non aromatic carbon double bond containing component (RU component) and in which at most 5 mol % of the reactive unsaturations are capable of undergoing homopolymerisation, i.e. at most 5 mol % (meth)acrylates. Thus, this publication teaches away from using (meth)acrylates.

The object of the present invention is to provide a two-component adhesive composition suitable for construction purposes, which has similar bonding properties like state-of-the-art epoxy-amine systems but which have a higher reactivity resulting in faster curing speed, higher performance at lower installation temperatures and despite the higher curing velocity provide a long gel-time, i.e. a long working time for the user resulting in higher flexibility in workflow, and which are free of corrosive amines, thus resulting in advantageous properties concerning environmental, health and safety aspects.

This object is provided by the two-component adhesive composition according to the claims.

Subject-matter of claim 1 therefore is a two-component structural adhesive composition suitable for construction purposes comprising a resin component A comprising a resin curable with a peroxide containing at least one norbornene group and at least one methacrylate containing compound at least part of it is monofunctional in methacrylate; and a hardener component B comprising a peroxide and at least one thiol; and wherein the resin component A and the hardener component B are spatially separated from one another to inhibit any reaction before mixing of said components.

The subclaims relate to further embodiments of this two-component adhesive composition, its use for structural bonding of concrete/concrete, steel/concrete, or steel/steel, as well as for structural strengthening and reinforcing applications with fiber reinforced polymers, comprising mixing the resin component A with the hardener component B, applying the mixture to the parts to be bonded and curing the composition, and cured structural bonds obtained thereby.

As can be taken from the examples and the comparative examples below, the two-component adhesive compositions of the present invention provides for a faster curing in comparison to the comparative adhesive compositions, longer gel-times and has a better performance at lower installation temperatures at −5° C. without a substantial decrease in the bonding performance.

An additional surprising advantage of adhesive compositions according to the invention is that the shrinkage upon curing is low. This is very surprising since it is known that methacrylate based resin compositions exhibit, upon curing, substantial shrinkage, generally in the order of 15-20%.

End segments where the resin compositions according to the present invention can be applied are structural bonding for construction purposes, particularly for structural bonding of concrete/concrete, steel/concrete, or steel/steel, as well as for structural strengthening and reinforcing applications with fiber reinforced polymers, but can also be used in for example automotive parts, boats, roofing, construction, containers, relining, pipes, tanks, flooring, windmill blades.

The resin component A of the adhesive composition of the present invention comprises as the resin curable by a peroxide a resin which comprises at least one norbornene group, preferably at least two norbornene groups and more preferably at least three norbornene groups per molecule.

The resin containing at least one norbornene group comprises as the norbornene group a group of the following general formula:

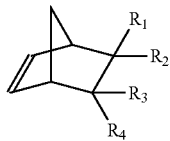

wherein each of the groups $R_1$, $R_2$, $R_3$, and $R_4$, can independently be chosen, for instance, from the group of hydrogen, carboxylates, nitriles, alkyl groups, alkenyl groups, aryl groups, and/or substituted derivatives of such groups, or wherein two or more of such groups may form additional ring structures, or wherein any of such groups is part of a polymeric residue. In a preferred embodiment, at least part of the norbornene groups in the resin is connected to the resin via both $R_1$ or $R_2$ and $R_3$ or $R_4$ as this generally result in improved mechanical properties.

According to another embodiment, besides the norbornene groups, the resin containing at least one norbornene group may contain other reactive carbon-carbon unsaturations as non-aromatic carbon double bond moieties preferably selected from the group of allyl, vinyl, (meth)acrylic, fumaric, maleic, itaconic, crotonic, or cinnamic double bond moieties, or of Diels Alder adducts thereof. When containing other reactive carbon-carbon unsaturations than norbornene, preferred are methacrylic groups.

Preferably, the resin contains at least two reactive carbon-carbon unsaturations, more preferably at least three reactive carbon-carbon unsaturations.

Preferably, the resin containing norbornene groups has a molecular weight of at least 500 Dalton, more preferably at least 750 Dalton and even more preferably at least 1000 Dalton. Preferably, the resin containing norbornene groups has a molecular weight of at most 10.000 Dalton, preferably at most 8000 Dalton, most preferably at most 6000 Dalton.

Many thiol-containing compounds can suitably be employed as thiol in the resin composition according to the invention. These compounds can be aromatic thiophenols, but also aliphatic thiols can be used. Preferably, the resin composition contains an aliphatic thiol.

Especially useful are the esters of α-mercapto acetate or β-mercapto propionate with mono alcohols, diols, triols, tetraols, pentaols and other polyols. The alcohol group, which is functionalized with the α-mercapto acetate or β-mercapto propionate, can be part of a polymer. Also mixtures of alcohols can be used. Most preferably, the aliphatic thiol is an α-mercapto acetate or β-mercapto propionate, or a derivative or mixture thereof.

Preferably, at least part of the thiols present in the resin composition has a thiol functionality of at least 2, more preferably at least 3

In a preferred embodiment, the resin composition comprises a mixture of thiols which mixture has an average thiol functionality of at least 1.5, preferably at least 2, more preferably at least 2.5.

In a preferred embodiment, at least a part of the thiol present in the resin composition is a thiol derived from a mercapto propionate or mercapto acetate Especially suitable thiols, with a thiol-functionality equal to or higher than 3 are trimethylolpropane tris-mercapto acetate, trimethylolpropane tris-mercapto propionate, pentaerythritol tetra-mercapto acetate, pentaerythritol tetra-mercapto propionate, dipentaerythritol hexa-(3-mercaptopropionate), glycerol tris-(3-mercaptopropionates), dipentaerythritol hexa-mercapto acetate, trivinylcyclohexyl polymercaptan, trithiocyanuric acid, and their ethoxylated or propoxylated derivatives.

The resin composition according to the invention comprises a methacrylate containing compound as reactive diluent. The diluent, for instance, will be applied for adjustment of the viscosity of the resin composition in order to make handling thereof more easy.

In a preferred embodiment of the invention, at least a part of the methacrylate containing compound is monofunctional in methacrylate because the use of monofunctional methacrylates may result in better adhesive properties. On the other side, a certain amount of di- and tri-functional methacrylates helps for faster and more efficient curing. Examples of preferred monofunctional methacrylates are methyl methacrylate (MMA), ethyl methacrylate (EMA), hydroxyethylmethacryle (HEMA), tetrahydrofurfuryl methacrylate (THFMA), and hydroxypropylmethacrylate (HPMA). Examples of preferred difunctional methacrylate containing compounds applicable as reactive diluents are ethylene glycol dimethacrylate (EGDMA), butanediol-1,4-dimethacrylate (BDDMA), triethyleneglycol dimethacrylate (TEGDMA), glycerol dimethacrylate (GDMA), tricyclodecane dimethanol dimethacrylate (TCDDMA), and as a preferred trifunctional methacrylate trimethylolpropane trimethacrylate (TMPTMA). Methacrylates with additional functional groups, like acetoacetoxyethyl methacrylate (AAEMA) or glycidyl methacrylate (GLYMA) can be used to induce particular properties, as well.

Preferably, the resin composition A comprises at least 15% by weight, more preferably at least 25% by weight of methacrylate containing compound. Preferably, the resin composition comprises at most 70% by weight, more preferably at most 60% by weight of methacrylate containing compound, in which 100% is the sum of the methacrylate containing compound and the resin containing norbornene groups. Preferably, at least 15%, more preferably at least 25% of the resin composition comprise of monofunctional The adhesive composition according to the invention preferably comprises the thiol and the resin containing at least one norbornene group in such amounts that the ratio of the norbornene groups in the resin component A and the thiol groups in the hardener component B ranges from 10:1 to 1:10 preferably 5:1 to 1:5 more preferably from 2:1 to 1:2 and most preferably is around 1:1.

The resin component A of the two-component adhesive composition according to the invention preferably further comprises a transition metal compound as a curing accelerator. The presence of such transition metal compound is beneficial as it accelerates the curing of the resin composition with a peroxide. The transition metal is preferably selected from the transition metals with atomic numbers ranging from atomic number of in the range from 22 to 29 or with an atomic number in the range from 38 to 49 or with an atomic number in the range from 57 to 79. More preferably, the transition metal is selected from V, Mn, Cu, Fe.

Said resin component A can contain co-accelerators like 1,3-dicarbonyl compounds, e.g. 1,3-diketones and aldehydes, in particular acetyl acetone, benzoyl acetone, and dibenzoyl methane; mono- and diesters, more in particular diethyl malonate and succinates, acetoacetates like ethyl acetoacetate, acetoxy acetyl ethylmethacrylate or the like, for further increasing the reactivity especially at low temperatures, if required.

The resin component A of the two-component adhesive composition according to the invention is curable with a peroxide. The peroxides used for the initiation of the curing reaction to obtain a structural part can be any peroxide known to the skilled man for being used in curing of unsaturated polyester resins and vinyl ester resins. Such peroxides include organic and inorganic peroxides, whether solid or liquid; also hydrogen peroxide may be applied. Examples of suitable peroxides are, for instance, peroxy carbonates (of the formula —OC(O)OO—), peroxyesters (of the formula —C(O)OO—), diacylperoxides (of the formula —C(O)OOC(O)—), dialkylperoxides (of the formula —OO—), etc. They can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

The peroxide is preferably a hydroperoxide, perether, perester, peranhydride or percarbonate, more preferably the peroxide is selected from the group of percarbonates, peresters and hydroperoxides and most preferably the peroxide is a monopercarbonate such as for instance Trigonox 117 or a perester such as for instance Trigonox C.

The storage stability of the resin compositions according to the invention is improved if, and this is preferred, the resin component A further comprises one or more inhibitors. Preferably at least one of the inhibitors is selected from phenolic compounds, N-oxyl compounds or nitroso compounds.

Suitable examples of inhibitors that can be used in the resin component A are, for instance, 2-methoxyphenol, 4-methoxyphenol, 2,6-di-t-butyl-4-methylphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

In accordance with the invention, the resin component A and/or the hardener component B contain at least one inorganic filler, such as, preferably, quartz, glass, corundum, porcelain, stone ware, light spar, heavy spar, gypsum, talcum, chalk or mixtures thereof, these fillers being contained in the form of sands, flours or molded objects, especially in the form of fibers or spheres.

To adjust the viscosity and flow behavior of the adhesive components, further additives like fumed silica, polymeric thickening agents, clays and the like can be incorporated in either one or both components.

According to a further preferred embodiment of the invention the adhesive composition is contained in a cartridge, a container, a capsule or a film bag, which comprises two or more chambers, which are separated from one another and in which the resin component A and the hardener component B are contained separated from one another to inhibit any reaction. When the inventive two-component adhesive composition is used as intended, the resin component A and the hardener component B are dispensed under the action of mechanical forces or by gas pressure from the cartridges, containers or film bags, mixed with one another, preferably with the help of a static mixer, through which the components are passed, and applied onto the surface to be bonded or the fasting device.

A further object of the invention therefore is the use of the two-component reaction resin described above for structural bonding of concrete/concrete, steel/concrete, or steel/steel, as well as for structural strengthening and reinforcing applications with fiber reinforced polymers.

The present invention also relates to structural objects as are being obtained when curing the two-component adhesive compositions according to the invention. These structural objects have excellent mechanical properties.

An additional object of the present invention is the use of the two-component adhesive composition as disclosed above for construction purposes, preferably for fastening of threaded anchor rods, reinforcing irons, threaded sleeves and screws in boreholes of any substrate, comprising curing the composition by mixing the resin component A with the hardener component B. The curing is preferably effected at a temperature in the range of from −20 to +200° C., preferably in the range of from −20 to +100° C., and most preferably in the range of from −10 to +60° C. (so-called cold curing).

The invention is now demonstrated by means of a series of examples and comparative examples. All examples are supportive of the scope of claims. The invention, however, is not restricted to the specific embodiments as shown in the examples.

EXAMPLES/COMPARATIVE EXAMPLES

A) Synthesis of the Norbornene Group Containing Resin

A 2 L reactor equipped with a mechanical stirrer and a Dean Stark set-up was charged with 402 g trimethylolpropane, 147 g maleic anhydride and 1.1 g dibutylhydroquinone. After heating this mixture to 100° C. during 2 h, 218 g toluene 10.9 g p-toluenesulphonic acid and 541 g crotonic acid was added. The reaction mixture was heated to reflux and the water was removed azeotropic during 28 hours. Next 7.7 g trimethylolpropane oxetane was added and the mixture was stirred at 100° C. for an additional hour. Then the toluene and the excess crotonic acid were distilled off resulting in a yellowish resin. This resin was heated to 165° C. and 550 g DCPD was added slowly during 8 hours whilst maintaining the reaction temperature between 165 and 180° C. After complete addition the reaction mixture was kept at 170° C. during 2 more hours before vacuum was applied (15 mBar) during 2 hours after which a norbonene functional resin was obtained. Butanediol-1,4-dimethacrylate (BDDMA) was added (27% by weight on final resin) to achieve good handling of the material.

B) Preparation and Testing of Adhesive Compositions According to the Present Invention and Comparative Mixtures The raw materials used are as follows:

| Raw material | Comment |
| --- | --- |
| Acac | Acetyl acetone |
| PET-3MP | Tetra functional Thiol: penta erythritol tetra mercaptopropionate |
| Trigonox C | Tert-Butyl perbenzoate |
| Octasoligen Mn-10 | Manganese catalyst (Mn(II)-ethylhexanoate) |
| TMPTMA | Trimethylolpropane trimethacrylate |
| Tempol | 1-Oxyl-2,2,6,6-tetramethylpiperidine-4-ol |

B1) Preparation of Resin Component A

To 47 gram of above resin was added 26 gram of the required methacrylate, and the mixture was stirred until the resin was completely dissolved (total methacrylate content 45% w/w=15%-by weight of BDDMA and 30%-by weight of methacrylate). Next 0.5 gram of a 1% w/w solution of Tempol in BDDMA and 1 gram of Mn-10 was added followed by 0.5 gram Acac.

The Compositions prepared are shown in Table 1

B2) Preparation of Hardener Component B 28 gram of PET-3 MP and 2 gram of Trigonox C were homogeneously mixed.

B3) Use of the Two-Component Adhesive Composition of the Present Invention

The resin component A and the hardener component B as obtained above, were introduced in side-by-side cartridges in a resin component A:hardener component B volume ratio of 3:1.

The resin component A and the hardener component B were extruded from their cartridges and passed through a static mixer. As the result, the resin component A reacts with the hardener component B curing of the adhesive composition. The reacting mixture is injected into a test tube (for measuring the gel-time) or onto the surface of a circular test specimen of steel, having 50 mm diameter, resulting in a layer of 1 mm of adhesive. These specimen were bonded either on steel or on concrete, curing was performed at ambient temperature (ca. 20° C.) (measuring pull-off values).

C) Testing of the Adhesive Composition (1) Gel-Time

The gel time of the mixtures, obtained in this way from the resin component A and the hardener component B of the two-component adhesive compositions, is determined with a conventional commercial device (gel timer) at a temperature of 25° C. For this purpose, the components A and B are mixed in a 3:1 ratio by volume and brought into a test tube up to about 4 cm below the rim, the tests tube being maintained at a temperature of 25° C. (DIN 16945, DIN EIN ISO 9396). A glass rod or a spindle is moved up and down in the resin with 10 lifts per minute. The gel time is the time at which the test tube is lifted by the oscillating rod. Random tests showed that the degree of curing at the gel point (measured by means of differential scanning calorimetry (DSC)) is constant within the accuracy of the measurement. The Gel-times as measured are shown in Table 2

(2) Pull-Off-Values—Bond-Strength

For determining the pull-off load values of the cured composition, a Pull-off tester DYNA 16 (tensile force 16 kN, according to ISO 4624, DIN1048, CEN/TC 125, BS 1881) was used, and the pull-off values were determined after different curing times. Bond strengths (N/mm$^2$) are obtained from the load values by dividing the load value by the bonded surface.

The bond-strengths are shown in Table 3

Results

TABLE 1

| | Compositions |
| --- | --- |
| Component A | Methacrylate diluent |
| A-1 | BDDMA/HEMA (15:30% by weight) |
| A-2 | BDDMA/HPMA (15:30% by weight) |
| A-3 | BDDMA/THFMA (15:30% by weight) |

Each composition contains 30% by weight of a monofunctional methacrylate.

TABLE 2

| | Gel-times |
| --- | --- |
| Component A | Gel-time at 25° C. |
| A-1 | 12:20 min |
| A-2 | 11:00 min |
| A-3 | 15:10 min |

TABLE 3

| | Bond-strengths | | |
| --- | --- | --- | --- |
| | Curing time [hh] | Concrete Bond strength [N/mm$^2$] | Steel Bond strength [N/mm$^2$] |
| A-1 HEMA | 2 | 5.0 | 3.8 |
| | 4 | 5.4 | 6.0 |
| | 6 | 5.2 | 3.6 |
| | 24 | 5.7 | 5.2 |
| A-2 HPMA | 2 | 2.8 | 4.4 |
| | 4 | 3.8 | 4.4 |
| | 6 | 4.5 | 5.4 |
| | 24 | 5.0 | 6.0 |
| A-3 THFMA | 2 | 2.5 | 2.6 |
| | 4 | 4.4 | 4.1 |
| | 6 | 5.1 | 5.1 |
| | 24 | 5.2 | 5.2 |

With a comparative system, an unfilled epoxy-amine adhesive according to EP 1118628, bond strengths of 6 . . . 7 N/mm$^2$ are achieved, but only after 24 hours, since considerable strength build-up of this systems starts only 6 hours after mixing resin and hardener.

Conclusions

The two-component adhesive composition of the present invention is superior in its performance as an adhesive on steel and on concrete. While providing similar bonding properties like the state-of-the-art methacrylate systems, the reactivity of the adhesive composition of the present invention is much higher resulting in a higher curing speed and a higher performance at lower application temperature. Despite the higher curing velocity of the adhesive composition of the present invention, they provide a long gel-time, which is reflected in a long working time for the user resulting in a higher flexibility in the work-flow. The two-component adhesive composition of the present invention is free of corrosive amines, resulting in superior environmental properties and with respect to health and safety aspects.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A two-component structural adhesive composition, comprising:
    a resin component A comprising a resin curable with a peroxide, wherein the resin contains at least one norbornene group and at least one methacrylate containing compound, wherein at least a part of the at least one methacrylate containing compound is monofunctional in methacrylate; and
    a hardener component B comprising a peroxide and at least one thiol;
    wherein the resin component A and the hardener component B are spatially separated from one another to inhibit any reaction before mixing of the components.

2. The adhesive composition according to claim 1, wherein the resin containing at least one norbornene group contains at least 2 norbornene groups per molecule.

3. The adhesive composition according to claim 1, wherein the resin containing at least one norbornene group has a molecular weight of at least 500 Dalton.

4. The adhesive composition according to claim 3, wherein the resin containing at least one norbornene group has a molecular weight of at most 10,000 Dalton.

5. The adhesive composition according to claim 1, wherein the resin containing at least one norbornene group contains as the norbornene group a group of the general formula:

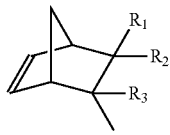

wherein each of the groups $R_1$, $R_2$, $R_3$, and $R_4$, are independently chosen from the group consisting of hydrogen, non-substituted or substituted carboxylate, nitrile, alkyl, alkenyl and/or aryl groups, wherein two or more of such groups may form additional ring structures, or wherein any of such groups is part of a polymeric residue.

6. The adhesive composition according to claim 5, wherein at least part of the norbornene groups in the resin is connected to the resin via both groups $R_1$ or $R_2$ and $R_3$ or $R_4$.

7. The adhesive composition according to claim 1, wherein the resin containing at least one norbornene group further contains at least one reactive carbon-carbon unsaturations as non-aromatic carbon double bond moieties selected from the group consisting of allyl, vinyl, (meth)acrylic, fumaric, maleic, itaconic, crotonic, or cinnamic double bond moieties, Diels Alder adducts, and combinations thereof.

8. The adhesive composition according to claim 7, wherein the resin containing at least one norbornene group contains at least two reactive carbon-carbon unsaturations.

9. The adhesive composition according to claim 1, wherein the methacrylate containing compound is monofunctional in methacrylate.

10. The adhesive composition according to claim 9, wherein the methacrylate containing compound being monofunctional in methacrylate is selected from the group consisting of methyl methacrylate (MMA), ethyl methacrylate (EMA), hydroxyethylmethacryle (HEMA), tetrahydrofurfuryl methacrylate (THFMA), and hydroxypropylmethacrylate (HPMA), acetoacetoxyethyl methacrylate (AAEMA) and glycidyl methacrylate (GLYMA).

11. The adhesive composition according to claim 1, wherein the resin composition A further comprises a methacrylate containing compound which is difunctional or trifunctional in methacrylate.

12. The adhesive composition according to claim 11, wherein the methacrylate containing compound being difunctional or trifunctional in methacrylate is
    selected from the group consisting of ethylene glycol dimethacrylate (EGDMA), butanediol-1,4-dimethacrylate (BDDMA), triethyleneglycol dimethacrylate (TEGDMA), glycerol dimethacrylate (GDMA), tricyclodecane dimethanol dimethacrylate (TCDDMA), trimethylolpropane trimethacrylate (TMPTMA), and combinations thereof.

13. The adhesive composition according to claim 1, wherein the resin component A comprises at least 15% by weight and at most 70% by weight of the methacrylate containing compound in which 100% is a sum of the methacrylate containing compound and the resin containing norbornene groups.

14. The adhesive composition according to claim 13, wherein the resin component A comprises at least 25% by weight of the methacrylate containing compound and at most 60% by weight of the methacrylate containing compound in which 100% is the sum of the methacrylate containing compound and the resin containing norbornene groups.

15. The adhesive composition according to claim 1, wherein the resin composition A comprises at least 15% by weight of methacrylate containing compound which is monofunctional in methacrylate.

16. The adhesive composition according to claim 1, wherein the hardener component B contains a thiol selected from the group consisting of aliphatic thiols and aromatic thiophenols.

17. The adhesive composition according to claim 1, wherein the hardener component B contains a thiol derived from a mercapto propionate or a mercapto acetate.

18. The adhesive composition according to claim 17, wherein the thiol is selected from the group consisting of trimethylolpropane tris-mercapto acetate, trimethylolpropane tris-mercapto propionate, pentaerythritol tetra-mercapto acetate, pentaerythritol tetra-mercapto propionate, dipentaerythritol hexa-(3-mercaptopropionate), glycerol tris-(3-mercaptopropionates), dipentaerythritol hexa-mercapto acetate, trivinylcyclohexyl polymercaptan, trithiocyanuric acid, and their ethoxylated or propoxylated derivatives.

19. The adhesive composition according to claim 1, wherein the ratio of the norbornene groups in the resin component A and the thiol groups in the hardener component B ranges from 10:1 to 1:10.

20. The adhesive composition according to claim 1, wherein the resin component A further comprises a transition metal compound as a curing accelerator.

21. The adhesive composition according to claim 1, wherein the resin component A further comprises a 1,3-dicarbonyl compound as a co-accelerator.

22. The adhesive composition according to claim 1, wherein any of the components A or B or both further comprises an inhibitor.

23. The adhesive composition according to claim 1, wherein the resin component A and/or the hardener component B contain at least one inorganic filler selected from the group consisting of quartz, glass, corundum, porcelain, stone ware, light spar, heavy spar, gypsum, talcum, chalk or mixtures thereof, these fillers being contained in a form of sands, flours or molded objects.

24. The adhesive composition according to claim 1, wherein the adhesive composition is contained in a cartridge, a container, a capsule or a film bag, which comprises two or more chambers, which are separated from one another and in which the resin component A and the hardener component B are contained separated from one another to inhibit any reaction.

25. A method of using the two-component adhesive composition according to claim 1 for structural bonding of concrete/concrete, steel/concrete, or steel/steel, as well as for structural strengthening and reinforcing applications with fiber reinforced polymers, comprising mixing the resin component A with the hardener component B, applying the mixture to the parts to be bonded and curing the composition.

26. The use according to claim 25, wherein the curing is effected at a temperature in a range of from −20 to +200° C.

27. A cured structural bond obtained by curing the adhesive composition according to claim 1 or obtained by the use according to claim 25.

\* \* \* \* \*